(12) United States Patent
Albrecht et al.

(10) Patent No.: US 8,477,442 B2
(45) Date of Patent: Jul. 2, 2013

(54) PATTERNED MEDIA FOR SELF-SERVOWRITING INTEGRATED SERVO FIELDS

(75) Inventors: Thomas Robert Albrecht, San Jose, CA (US); Jonathan Darrel Coker, Rochester, NY (US); David Timothy Flynn, Mantorville, MN (US)

(73) Assignee: HGST Netherlands B.V., Amsterdam (NL)

( * ) Notice: Subject to any disclaimer, the term of this patent is extended or adjusted under 35 U.S.C. 154(b) by 509 days.

(21) Appl. No.: 12/800,300

(22) Filed: May 11, 2010

(65) Prior Publication Data

US 2011/0279924 A1 Nov. 17, 2011

(51) Int. Cl.
*G11B 5/09* (2006.01)
*G11B 21/02* (2006.01)
*G11B 5/596* (2006.01)

(52) U.S. Cl.
USPC .............................. 360/48; 360/75; 360/77.08

(58) Field of Classification Search
None
See application file for complete search history.

(56) References Cited

U.S. PATENT DOCUMENTS

| | | | |
|---|---|---|---|
| 6,078,445 A | 6/2000 | Serrano et al. | |
| 6,967,808 B1 | 11/2005 | Bandic et al. | |
| 6,995,938 B2 | 2/2006 | Coker et al. | |
| 7,193,800 B2 | 3/2007 | Coker et al. | |
| 7,342,734 B1 | 3/2008 | Patapoutian et al. | |
| 7,586,709 B2 | 9/2009 | Fukushima et al. | |
| 7,656,605 B1 | 2/2010 | Sutardja | |
| 2006/0066994 A1 | 3/2006 | Suzuki et al. | |
| 2008/0239906 A1 | 10/2008 | Akagi et al. | |
| 2008/0266701 A1 | 10/2008 | Albrecht et al. | |
| 2009/0097160 A1 | 4/2009 | Yamamoto | |
| 2009/0168227 A1 | 7/2009 | Blaum et al. | |
| 2009/0168229 A1 | 7/2009 | Albrecht et al. | |
| 2010/0018945 A1 | 1/2010 | Guo et al. | |
| 2010/0033868 A1 | 2/2010 | Hattori et al. | |
| 2011/0149432 A1* | 6/2011 | Coker et al. | 360/77.08 |
| 2011/0149433 A1* | 6/2011 | Coker et al. | 360/77.08 |
| 2011/0149434 A1* | 6/2011 | Coker et al. | 360/77.08 |
| 2011/0188149 A1* | 8/2011 | Albrecht et al. | 360/71 |
| 2011/0188152 A1* | 8/2011 | Albrecht et al. | 360/75 |

FOREIGN PATENT DOCUMENTS

WO WO2008105334 A1 9/2008

OTHER PUBLICATIONS

Xiaodong Che, "Study of Lithographically Defined Data Track and Servo Patterns," IEEE Transactions on Magnetics, vol. 43, No. 12, Dec. 2007, pp. 4106-4112.

M. Nishikawa, "Potential of Servo Pattern Printing on PMR Media with High-Density Servo Signal Pattern," IEEE. Transactions on Magnetics, vol. 42, No. 10, Oct. 2006, pp. 2612-2614.

(Continued)

*Primary Examiner* — Regina N Holder
(74) *Attorney, Agent, or Firm* — G. Marlin Knight

(57) ABSTRACT

Pre-patterned discrete track media for self-servo writing are described. Embodiments include land and groove patterns for two or more Integrated Servo sequence fields for each servo sector in which one of the Integrated Servo sequence fields is aligned with the data track and a second sequence is offset by one-half of a track width. The lands and grooves between the Integrated Servo sequence fields are preferably the same width as those between the data tracks to facilitate planarization. Alternative embodiments include a sync feature for each servo sector formed by a selected groove and/or land pattern as a marker for the start of the servo fields. Alternative embodiments include a bootstrap zone with servo patterns that are readable when DC-magnetized. Described methods of self-servowriting include ways to adapt to eccentricity and non-circularity of pre-patterned discrete tracks with respect to the head paths.

18 Claims, 5 Drawing Sheets

OTHER PUBLICATIONS

M.T. Moneck, "Lithographically Patterned Servo Position Error Signal Patterns in Perpendicular Disks," Journal of Applied Physics 103, 07C511 (2008), 3 pages.

T. Hamaguchi, "An Accurate Head-positioning Signal for Perpendicular Recording Using a DC-free Servo Pattern," Journal of Applied Physics, vol. 91, No. 10, May 15, 2002, pp. 8697-8699.

* cited by examiner

PATTERNED MEDIA FOR SELF-SERVOWRITING INTEGRATED SERVO FIELDS

RELATED APPLICATIONS

This application refers the concepts of "Integrated Servo fields" which are described in previously filed, commonly assigned U.S. patent applications bearing Ser. Nos. 12/653,874; 12/653,862; 12/653,863 (each with a filing date of Dec. 18, 2009). In addition this application refers the concepts in commonly assigned U.S. patent applications bearing Ser. No. 12/699,501 filed Feb. 3, 2010 titled "SERVO PATTERNING AND WRITING COMPATIBLE WITH PLANARIZATION OF PATTERNED MAGNETIC DISKS;" and Ser. No. 12/699,581 filed Feb. 3, 2010 titled "SERVO PATTERNING COMPATIBLE WITH PLANARIZATION OF PATTERNED MAGNETIC DISKS."

FIELD OF THE INVENTION

This invention relates generally to information storage systems with recording disks that rotate, and more particularly to methods and apparatus for writing and forming servo patterns on the recording disks.

BACKGROUND

Commercial magnetic disk drive areal densities now exceed 300 Gbits/sq. in., and track densities can be greater than 250,000 tracks per inch. Advanced servo techniques are required to further improve disk drive performance. At the needed track densities, the heads must stay centered on the narrow tracks to within a tolerance on the order of a few nanometers as the disk rotates under the heads at thousands of rpm. The servo fields, which encode positional information, are permanently written onto the disk during the manufacturing process. The servo information is processed by an electronics control system that adjusts the position of the actuator on which the heads are mounted.

The process by which the position information is written onto the disks is referred to as servowriting. Conventionally servowriting is performed by a dedicated device called servowriter that is distinct from the disk drive itself. This method of servowriting is performed in a clean room and uses sensors that are inserted into the head disk assembly to provide the precise angular and radial position information to write the servo patterns. Another approach is have the disk drive heads write the servo information, i.e., to perform self-servowriting.

One technique for improving areal densities is to alter the physical organization of the magnetic thin films on the disks by forming a pattern in the films. Conventional magnetic disks have continuous thin films in which the magnetic transitions are recorded. Discrete track media have been proposed in which the tracks are formed from continuous strips or rings of magnetic material separated by small gaps where the magnetic material has been removed. More recently bit-patterned media (BPM) have been proposed that use nanometer scale magnetic islands or dots arranged in tracks on the recording surface. Discrete track media and bit-patterned media place constraints on servo pattern design, in that any pre-patterned features need to be compatible with appropriate planarization methods. In general, this planarization constraint requires that all pre-patterned features are constructed of grooves and lands with common dimensions (i.e., servo patterns have the same land and groove dimensions as data tracks). The planarization constraint allows grooves to vary in orientation and absolute position, provided land and groove dimensions are generally fixed.

The servo data on the disk provides several fundamental functions and is conventionally arranged in four distinct fields that are disposed in sequence in each servo sector along the direction of the track. First, it supplies a timing mark (known as the Servo Track Mark (STM) or Servo Address Mark (SAM)) which is used to synchronize data within the servo fields, and also provides timing information for write and read operations in the data portions of the disk. Second, the servo area supplies a 10-30 bit digital field, which provides a integer track-ID (TID) number and additional information to identify the physical servo sector number. The TID is typically written in Gray code as the presence or absence of recorded dibits. During seek operations, when the head is moving across tracks, the head can typically only read a portion of the Gray-code in each TID. The Gray-code is constructed so that pieces of the TID, in effect, can be combined from adjacent tracks to give an approximate track location during a seek. The servo field also includes a position error field, which provides the fractional-track Position Error Signal (PES). Auxiliary functions, such as amplitude measurement or repeatable run-out (RRO) fields are sometimes also used. During read or write operations the drive's servo control system uses the PES servo information recorded on the disk surface as feedback to maintain the head in a generally centered position over the target data track. The typical PES pattern is called a quad-burst pattern in which the bursts are identical sets of high frequency magnetic flux transitions. Unlike the track-ID (TID) field number, the PES bursts do not encode numerical information. In contrast to the TID, it is the position of the bursts that provide information on where the head is relative to the centerline of a tracks. The quad-burst pattern is repeated for each set of two tracks, so only local information is provided. Each servo wedge has four (A,B,C,D) sequential slots reserved for PES bursts. Each track has a centered PES burst in only one of the four slots. Thus, when the head is centered over a selected track, it will detect the strongest signal from a burst centered on the selected track, but it will also detect a weaker signal from bursts on the adjacent tracks. For example, when the head is centered over a track with a burst in the A-position, it might also detect a subsequent weak B-burst on the adjacent track on the right and then a weak D-burst from the adjacent track on the left. When the head passes over the PES pattern, the bursts that are within range generate an analog signal (waveform) that indicates the position of the head over the disk and is used as feedback to adjust the position of the head.

The overhead on the disk to support these functions is a large factor in the drive's format efficiency. Typically, the servo fields can consume between 5% and 10% of the recording surface of the disk. As areal density gains in the magnetic and data signal processing components become harder and harder to achieve, the servo overhead becomes a more and more attractive target for reduction, and relief of necessary areal density targets to achieve particular HDD capacity points.

Published US patent application 20090097160 by Yamamoto (Apr. 16, 2009) describes a magnetic recording disk with pre-patterned servo sectors, wherein each data bit is stored in a magnetically isolated data island on the disk. The servo sectors include a synchronization pattern of generally radially directed discrete magnetized marks, and first and second position error signal (PES) fields of generally radially directed discrete magnetized stripes. Each stripe in each of the two fields comprises a plurality of radially spaced discrete servo islands, each island having a radial width of approximately Tp, where Tp is the radial spacing of the track centerlines. In each field, the servo islands in alternating stripes in the along-the-track direction are shifted radially by approximately Tp. In the first PES field, the islands are centered at the midline between two adjacent track centerlines, and in the second PES field the islands are centered at a track centerline. All of the servo islands in the two PES fields have the same magnetization direction.

U.S. Pat. No. 7,656,605 to Sutardja (Feb. 2, 2010) describes a method for repeatable run-out (RRO) compensation in a disk drive using self-servo writing. RRO is described as an error signal that is repeated with each rotation of the disk, but Sutardja does not specify how the error signal is obtained for disk prior to servo-writing. Sutardja's RRO compensation system processes residual error metrics through a plant model of a control system to generate updates to an RRO compensation table. Sutardja states that when the plant model and the repeatable component are known exactly, the lookup table stores the correct value of the RRO error after a single update step. When the plant model is not known exactly, the repeatable component is nonetheless reduced after each iteration and the algorithm is convergent. The RRO lookup table is created before self-servo write operations and is used during self-servo write operations to compensate for the RRO so that the final written servo tracks include minimal RRO effects.

Published US patent application 20080239906 by Akagi et al. (Oct. 2, 2008) describes self-servo writing (SSW) on the servo region formed from a flat section of a discrete track medium. Pre-patterned radial grooves on the disk are used as SSW timing detection patterns. The radial grooves are formed simultaneously with the grooves that separate the discrete tracks. Repeatable run-out (RRO) error signals used for positioning control along the radius are written in the servo information on a flat section of the disk. A servo writing method for correcting eccentricity between the pattern forming section (data track) and the flat section (servo track) is implemented by the following sequence: (1) Self-servo writing is first performed according to the timing pattern. (2) Data is recorded on the data region at a single frequency while following the servo pattern written by SSW. (3) A read-back waveform is acquired from the single frequency recording pattern just recorded. The read waveform is modulated by the read head cutting across the groove on the discrete track. This modulation envelope is made up of a 1st order synchronization oscillation (RRO). (4) Analysis of the read waveform envelope gives the RRO value, and the eccentricity quantity calculated in order to cancel out the modulation component in the read waveform. (5) SSW is again performed based on the eccentricity quantity in (4), and a servo track is obtained along the patterned data track. (6) The above steps (1) through (5) are repeated several times as needed to achieve servo write with reduced eccentricity. Akagi describes storing the eccentricity compensation value as an 8 bit RRO field in the servo pattern written on the disk.

Published PCT patent application WO2008105334 by Ono describes a method of detecting eccentricity in a track on a discrete track disk without referencing a servo pattern. The method includes writing data in a predetermined region while moving the head stepwise radially and then reading the data with the head "at rest."

Published US patent application 20090168229 by Albrecht; et al. describes a method of fabricating servo sectors of a patterned storage media with two arrays of discrete islands in a servo sector. The first array defines at least two burst fields. The second array also defines at least two burst fields. The second array is formed with a track-wise offset (i.e., an offset in the radial direction) from the first array. The offset between the first array and the second array may be about a half track offset, but the amount of offset between the arrays may vary depending on design preferences. Another step of the method comprises performing a servo writing process to define the polarity of the islands in the arrays. The servo writing process is performed by circumferentially writing one or more rows of islands to define the servo pattern in the servo sector. The servo pattern may be burst fields, sync fields, etc. The servo pattern generated by the servo writing process allows a quadrature signal to be generated when a read/write head passes over a track of the patterned storage media.

One way to form servo patterns on a BPM disk is to create readable servo patterns from unipolar magnetized bit lands formed by direct current (DC) magnetization of the entire disk. One characteristic of patterned media is that the circular tracks formed on the disk by thin film processes are generally not centered with the center of rotation of the disk once it is mounted on the spindle. Therefore, the servo system must detect the deviations of the track geometry and adjust the position of slider based on this knowledge in order to accurately follow the track.

One problem with available planarization methods is that relatively large depressions, where magnetic material has been removed, that are included in the servo patterns cannot be filled. For planarization using liquids, for example, the grooves must be small enough for to capillary forces to planarize the liquid before curing. For other planarization techniques, such as deposition and etch-back planarization, the land to groove width ratio should be constant. But prior art servo patterns inherently have varying shapes and sizes that do not fit into this constraint.

Published US patent application 20100033868 by Hattori; et al. describes a method for writing servo patterns that includes using different drive currents for an actuator pushed against a crash stop to define a swing range of the actuator. A write operation is performed using at least one of the plurality of different drive currents to write servo pattern tracks including a plurality of separate servo pattern sectors. The drive current is also gradually changed while pushing the actuator into the crash stop to gradually move a read element in searching for a servo pattern track already written by the write element.

SUMMARY OF THE INVENTION

Embodiments of the invention describe pre-patterned discrete track media that can be self-servo written with Integrated Servo patterns by the disk drive. Described methods of self-servowriting the necessary Integrated Servo patterns include ways to adapt to eccentricity and non-circularity of pre-patterned discrete tracks with respect to the read and write head paths. Embodiments of a patterned disk according to the invention include land and groove patterns for two or more Integrated Servo sequence fields for each servo sector in which a land for one of the Integrated Servo sequence fields is aligned with the data track and a land for a second sequence is offset by one-half of the width of a data track. The lands and grooves between the Integrated Servo sequence fields are preferably the same width as those between the data tracks to facilitate planarization. Alternative embodiments include a sync feature for each servo sector in the data zone which is formed by a selected groove and/or land pattern that can be detected by the read head as a marker for the start of the servo fields.

Some embodiments of pre-patterned disks according to the invention include a pre-patterned bootstrap zone on the disk which has pre-patterned lands of magnetic material that serve as conventional servo patterns when DC-magnetized. These pre-patterned lands of magnetic material can be DC-magnetized as a part of the manufacturing process for the disk by applying a DC magnetic field to the disk before the disk is installed in a disk drive. Alternatively the write head in the disk drive can be used to DC-magnetize these lands after the disk is installed in the drive. After servowriting is completed the bootstrap zone is not needed or used. Some embodiments of pre-patterned disks according to the invention have no special bootstrap zone and the start-up process takes place on tracks with patterns the same as the data zone.

The invention also includes embodiments of a self-servowriting process for tracks in the data zone. Self-servowriting requires a start-up procedure (that preferably begins at the ID of the disk), followed by self-propagating writing of the servo patterns in all the remaining tracks on the disk.

The invention includes alternative methods for the start-up procedure for self-servowriting. Embodiments of the method include determining the servo compensation required to follow the eccentricity of pre-patterned tracks. The required compensation is found by an iterative process that can either detect pre-patterned features on the disk in the bootstrap zone or alternatively write test patterns that can be used to detect deviations from correct track following. Once required compensation has been found, the Integrated Servo sequences can then be written on the dedicated lands in each servo sector in each track.

Alternative embodiments for the servo patterns for the bootstrap zone include:

a. bootstrap zone with pre-patterned track ID (Gray code) and PES bursts that can be similar to servo patterns used in conventional drives, except that they are made of pre-patterned features which are readable in a DC-magnetized state. Note that in this embodiment the bootstrap zone is not well planarizable, since complex Gray code patterns have grooves and lands of varying widths that impede planarization. However, the relatively small size of the bootstrap zone in relation to the air-bearing surface of the slider allows the slider to still fly acceptably.

b. bootstrap zone with pre-patterned PES bursts, but no track IDs. This alternative has the advantage that the bootstrap zone can be planarized if the PES bursts have the same land and groove widths as the data tracks. For example, PES bursts that are null or phase patterns can have the same land and groove widths as the data tracks and be equally planarizable. For the bootstrap zone with no track IDs, the startup procedure is somewhat more complex because determining the eccentricity of the tracks, requires that track crossings be detected to keep track of full eccentric trajectory of the tracks relative to the path of the read head.

Alternative embodiments of the servo patterns in the bootstrap zone include adding Integrated Servo field patterns that can be read when DC-magnetized. By including both conventional servo patterns and Integrated Servo fields in the portion of the bootstrap zone near the data zone, the transition from track following one type of servo field to track following the Integrated Servo fields can be facilitated. In the transition area, where the two types of fields are included, the Integrated Servo fields can be included in every servo sector in tandem with the conventional field or, for example, in every other servo sector.

DETAILED DESCRIPTION OF THE INVENTION

Figure 1:
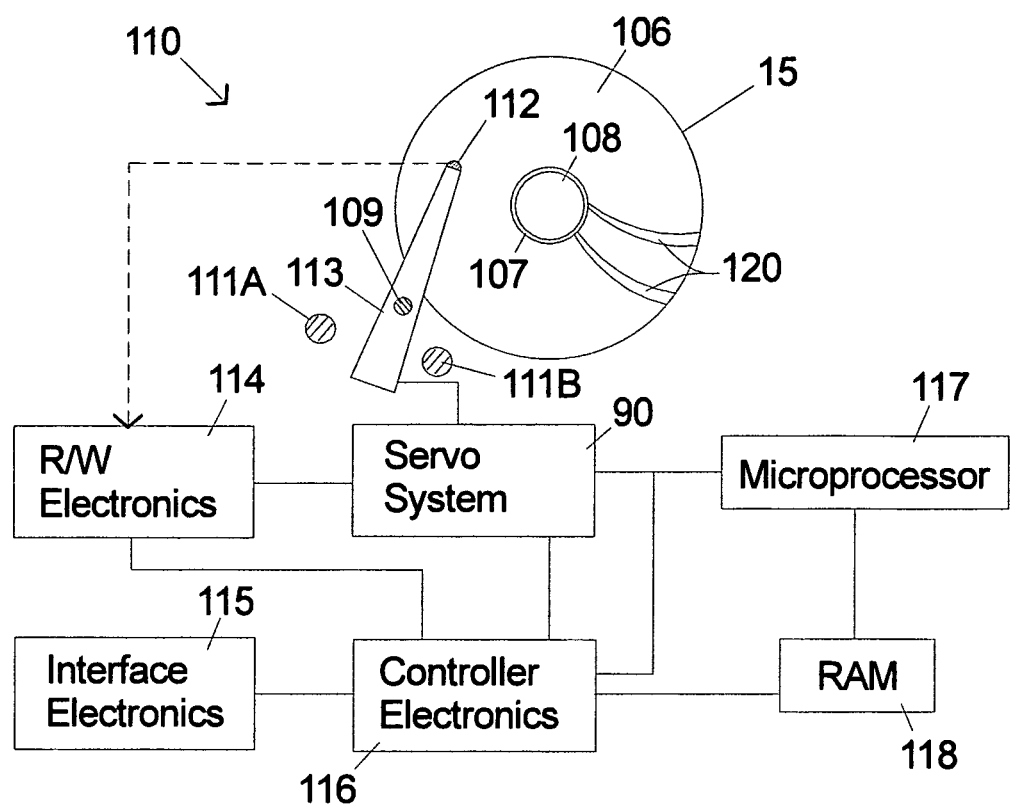
FIG. 1 is a block diagram illustrating a disk drive system according to an embodiment of the invention.

FIG. 1 is a block diagram illustrating an information storage system (disk drive) 110 according to an embodiment of the invention. The disk drive includes data recording disk 15 on which thin film ferromagnetic materials have been patterned into discrete tracks (not shown). As in prior art practice a disk drive can contain multiple disks and sliders, but only one is shown. Actuator arm 113 is mounted to pivot around mounting point 109 by being driven conventionally by a VCM (not shown). Slider 112, which contains the read head and write head (not shown), is attached to actuator arm 113. Inner and outer crash stops 111A, 111B are positioned to limit the mechanical travel of actuator arm 113. The electronics in the disk drive include servo system 90, read/write electronics 114, interface electronics 115, controller electronics 116, microprocessor 117, and RAM 118. The basic system components are generally according to the prior art except as described herein. A disk drive can include multiple disks stacked on hub 108 that is rotated by a disk motor (not shown), with a separate slider for each planar surface of each disk. The term servo wedge 120 will be used to mean the contiguous set of servo fields extending from ID to OD on the disk. As in the prior art, a disk 15 according to the invention will typically have multiple servo wedges 120 periodically arranged around the disk, but only two are shown. The servo wedges 120 are self-written by the disk drive as will be described. The servo bootstrap zone 107 at the inner diameter (ID) is formed as part of the manufacturing process of the disk as will be described. The data zone 106 extends from the bootstrap zone 107 to the outer diameter (OD).

This application refers the concepts of "Integrated Servo fields" which are fully described in previously filed, commonly assigned U.S. patent applications bearing Ser. Nos. 12/653,874; 12/653,862; 12/653,863. The Integrated Servo fields allow servo information to be encoded in a more compact way than traditional servo fields. Integrated Servo encodes binary location data such as track ID, sector ID and allows detection of the fractional-track PES from a very compact set of fields.

In one embodiment the Integrated Servo fields consist of sequences from a predetermined sequence set of length 12 and are arranged in pairs on the disk so that adjacent sequences are mathematically orthogonal. The predetermined sequence set of length 12 described, includes a total of 18 allowed sequences, which includes antipodal sequences. The predetermined sequence set does not include all possible combinations of binary values. For example, a particularly useful set of sequences have equal numbers of "+" and "−" binary values, which are "DC-free" when the two binary values are recorded as opposite magnetic transitions on the recording disk. The arrangement of the sequences in the servo wedges encodes desired digital location information such as the track and sector number while also supplying an analog PES for fractional track positioning.

In one embodiment of the Integrated Servo design location identifiers such as the track-ID are distributed across multiple servo wedges. This greatly improves the implementation efficiency of the system by limiting the number of sequences needed to represent tens of thousands of tracks on a disk. Within the method of the invention many different methods of mappings of sequences in consecutive servo wedges into track identifiers are possible. For example, one embodiment employs a mapping based on the Chinese Remainder Theorem using 4 remainder values (Mod 64. Mod 63, Mod 61, Mod 59), which are encoded in pairs of sequences distributed across 4 consecutive servo wedges for a track.

Figure 2:
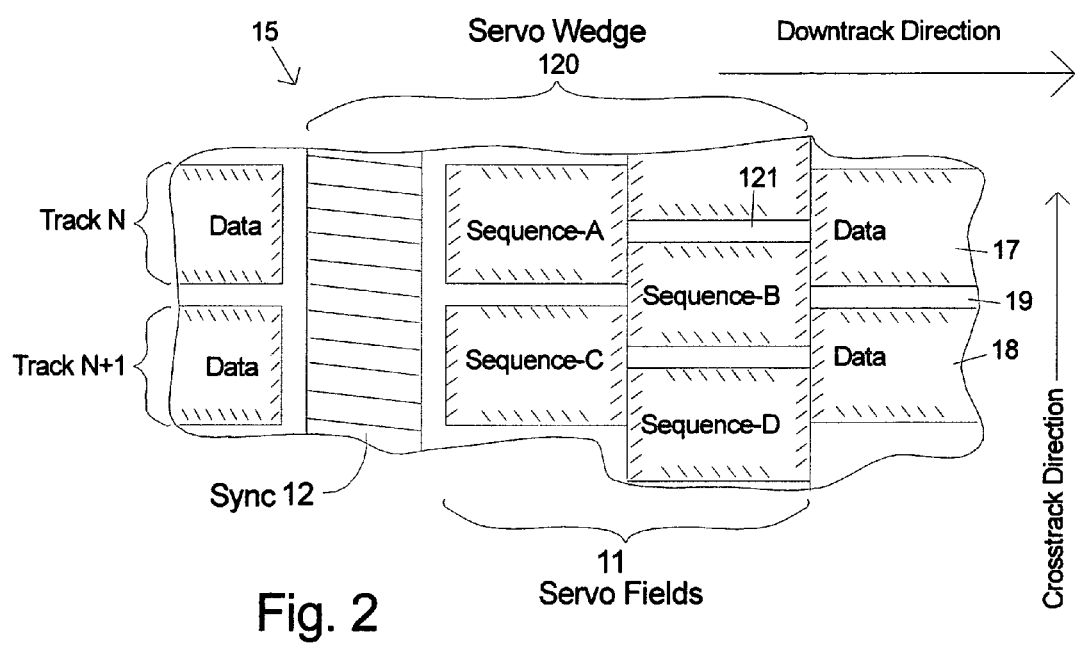
FIG. 2 is an illustration of an embodiment of Integrated Servo fields in a tandem/offset arrangement on a discrete track disk according to the invention.

FIG. 2 is an illustration of an embodiment of Integrated Servo (IS) fields 11 in a servo wedge 120 on a pre-patterned disk 15 with discrete tracks according to the invention. Only a small portion of two data tracks is shown. Hundreds of thousands of tracks typically appear on a disk in a disk drive. The width of the data tracks is the width of the data that is written by the write head in the disk drive. The effective reading width of the read head may be slightly less than the writing width. Only four Integrated Servo sequences (A-D) are shown in this illustration, but a practical embodiment will include a larger number of sequences as will be described below. The effective reading width of the read head in this example is, therefore, approximately equal to or slightly less than the width of one sequence. The read signal will, therefore, necessarily include contributions from at least two sequences as the disk rotates under the read head. For example, if the read head passes over the center of Sequence-C, it will straddle the edges of Sequences-B & D and the read signal will include contributions from both Sequences-B & D. The sequences are selected and arranged on the disk to facilitate decoding of adjacent sequence contributions in the read signal. An Integrated Servo field for track N is composed of encoded sequences A and B, which are members of a selected sequence set. Similarly Integrated Servo field for track N+1 is composed of encoded sequences C and D, which are also members of the selected sequence set. In the embodiment described above for length 12 sequences, the sequences are one of 18 allowed sequences, but are further constrained by the requirement that adjacent sequences in the cross track direction must be mathematically orthogonal. Thus, in this example Sequences A & C are required to be mathematically orthogonal, as are Sequences B & D.

In this embodiment the width of the encoded sequences A-D is equal to the data track width. Sequences A and B for track N are written in tandem with sequence B being offset by one-half the width of a data track. The contents of Integrated Servo fields 11 are written by the disk drive's write head on pre-patterned fields of lands of magnetic material defined by grooves from which magnetic has been removed. Thus, the block shown as Sequence-A corresponds to a land of magnetic material surrounded on 3 sides by grooves. Similarly the block shown as Sequence-B corresponds to a land of magnetic material surrounded on 2 sides by grooves. In an alternative embodiment the tandem sequences could be separated by a radial groove (not shown) that would extend vertically in FIG. 2 between sequences A & C and sequences B & D. Similarly a radial groove could be used to separate the sequences from the data fields. On this pre-patterned disk the widths of the lands and grooves are approximately the same as those for the data tracks to provide for good planarization. However, the lands for one set of the sequences is shifted radially by a half track (see for example groove 121 above Sequence-B). In this example the trailing set of sequences are offset, but alternatively the leading set of sequences could be offset and the trailing sequences could be aligned with the data tracks. The spaces shown between the IS sequences and between the data tracks are all grooves formed by removing the thin film magnetic material during the patterning process. The groove 19 between data fields 17, 18 extends the full length of the sector. An optional synchronization mark 12 can be provided to maintain precise phase positioning (i.e. circumferential positioning) of patterns during propagation of the self-servo written pattern. This synchronization mark 12 is shown as a single, continuous land (with corresponding grooves) extending radially along the front edge of the servo wedge, but it may be a single groove or any pattern of lands and grooves arranged to deliver a detectable sync signal through the read head when DC magnetized.

The PES for fractional track positioning of the head in embodiments of the invention is obtained from signal amplitudes from two or more sequences. As an example, assume that the read head reading width is approximately equal to the data track width and the disk is rotating under the read head from right to left as shown in FIG. 2. If the head is centered over track N+1, the read path passes directly over the Sequence C field on the left and then straddles Sequences B and D on the right. In this type of embodiment, there will be either 1 or 2 sequences under the head at one time. If the head reads one sequence in the first field, for example, then the head typically can read two adjacent sequences in the second field. Similarly if the head is aligned with respect to the boundaries so that only one sequence in the second field is read, then two sequences can be read from the first field. This one-half data track offset arrangement mimics the standard quad-burst PES arrangement of the prior art sufficiently to allow standard PES calculations to work in the case when two adjacent fields are read. When the head is not centered on either field, the head might read two adjacent sequences in each field. This embodiment is easily configurable to mimic the characteristics of prior art PES systems because the amplitude of the signal read for adjacent field tells the servo system where the head is in relation to center of the data track in the same way that the amplitude of the signals read from quad-burst PES do.

Various embodiments of pre-patterned disk and the initialization (or "bootstrapping") of the self-servowriting process will be described. In one embodiment, a narrow bootstrap zone formed on the disk includes sector header patterns with pre-patterned track/sector IDs and PES bursts, all of which can be decoded in a DC-planarized state. These pre-patterned fields allow the servo system to detect and compensate for track eccentricity and repeatable run-out (RRO). Because these fields as conventionally designed will have varying sized lands on a bit-patterned disk, they can be considered to be non-planarizable, which is made tolerable because of the small size of the bootstrap zone. An iterative testing process is used to determine feed-forward compensation that will allow the servo system to lock to the tracks in the bootstrap zone. The same feed-forward compensation can be used to self-servo write the required servo pattern throughout the data zone.

In a second embodiment, the bootstrap zone is pre-patterned with PES bursts (that are readable with DC magnetization), but no track/sector IDs are included. By omitting the track/sector IDs, the PES bursts can be designed to have the same lands and grooves as the data zone so that the bootstrap zone is planarizable, which is an advantage. An iterative testing process detects and compensates for eccentricity and RRO using detected track crossings instead of relying on track IDs as described above.

In a third embodiment, no special pre-patterned bootstrap zone exists (i.e., same land/groove patterns occur from ID to OD) and track crossings are detected by trial writes and reads to establish eccentricity and RRO for pattern propagation.

For patterned media, there are two constraints that are highly desirable:

1. Servo patterns are physically aligned (registered) with the pre-patterned tracks, so that a complex "learning" process is not needed to relate track and servo pattern positions.

2. Servo patterns in the data zone of the disk are formed with the same land and groove dimensions as the data tracks to facilitate planarization.

An ideal approach for patterned media is to completely pre-pattern the sector headers, eliminating any need for servowriting and thereby reducing manufacturing cost. However, no practical method has yet been described with fully pre-patterned servo that meets the above constraints. In particular, constraint #2 highly restricts the ability to encode complex binary data such as prior art STM, SID, and TID. One approach is to continue the use of servowriting by dedicated servowriters, but to do so in a way that simplifies the requirements and tolerances of the servowriting operation, while providing good alignment between servo-written patterns and pre-patterned tracks. One way to achieve these goals is to provide pre-patterned features on the disk that define the circumferential edges of servo fields for the servowriter. If the pre-patterned tracks and the pre-patterned servo field edge features are generated together in a single step, the servo fields will automatically be aligned with the pre-patterned tracks.

In order to adhere to constraint #2 above, the Integrated Servo (IS) pattern of FIG. 2 is used so that each field is a full track wide with pre-patterned grooves at the same spacing as the grooves between data tracks. The patterns extend to all tracks not just the two shown. In this embodiment the first sequence is recorded in fields that are aligned with the data tracks, and the second sequence in a field which is radially shifted by a half track pitch. A self-propagating in-drive servowriting operation is used to generate the magnetized IS sequences in the various fields. A positive consequence of having pre-patterned grooves between tracks, both for the shifted and non-shifted fields, is that the circumferential edges of the servo fields are pre-patterned. Thus, small misalignment of the write head are rendered negligible because the circumferential grooves act to trim the written sequence edge. This means that any misregistration of the head, within the limit of the groove width, has little or no effect on the final written pattern of transitions for the sequences. As a consequence, tracking errors during the servowriting process do not accumulate and propagate from track to track. Servowriting in this manner requires less stringent control over head position, requiring less sophisticated hardware and software than conventional self-servowriting. The prospect of in-drive self-servowriting, without the aid of additional expensive equipment, is more easily implemented in this embodiment than for a conventional drive with non-patterned media.

During the self-servowriting process, to keep servo fields on adjacent tracks adequately phase aligned, and to keep the sequences within their respective fields during pattern propagation across the disk, a pre-patterned synchronization feature (such as sync mark 12) may be provided on the pre-patterned disk. Such a pattern can be constructed out of radial lands and grooves with the same dimensions as the data tracks (to adhere to planarization constraint #2). The synchronization mark may be as simple as a single groove, or a sequence of multiple grooves and lands if SNR for detection needs to be increased. Sync mark 12 as shown in FIG. 2 is a land defined by a groove on each side. The lands and grooves that form the sync mark 12 should be approximately the same size as the other lands and groove on the disk to maintain good planarization. In alternative embodiment, other sync feature designs can be used so long as they can be recognized as an amplitude modulation (one or more drop-outs) in a DC or otherwise magnetized pattern recorded over the feature(s).

Another embodiment, which requires a more complex implementation in the self-servowriting system, but results in fully planarizable patterns in the bootstrap zone, is to create unique pre-patterned servo patterns in the bootstrap zone which can be read in the DC magnetized state to provide track crossing and fractional track position information, but leave out track IDs. The accounting of track ID numbering/counting is then left to a counting algorithm within the self-servowriting system. A version of this approach is described in detail in related application with Ser. No. 12/699,581 filed Feb. 3, 2010 "SERVO PATTERNING COMPATIBLE WITH PLANARIZATION OF PATTERNED MAGNETIC DISKS."

Finally, it is possible to bootstrap the self-servowriting operation without any specially patterned bootstrap zone (i.e., bootstrap zone is the same as the main data zone). By performing test/trial writing of Integrated Servo (IS) patterns (or other patterns which generate independently quantifiable amplitude responses in a read head spanning two written tracks), track crossings can be counted and fractional track positions determined for the purpose of eccentricity and runout cancellation.

Due to tolerances in the patterning of the disk and mounting on the drive spindle, there will generally be significant eccentricity of the pre-patterned DTM tracks relative to the spindle center of rotation. This may range from a few track widths to hundreds of track widths. (Note that track pitch can be on the order of 60 nm). The force with which the actuator is pushed against the crash stop is controlled by setting the current through the VCM. By varying the force pushing against the elastic crash stop, a range of movement of the actuator (and the attached sliders) is obtained to allow a sufficiently wide band to be written so that all or a significant fraction of the total RRO range of the pre-patterned DTM tracks can be accommodated within the written band. By pushing the actuator (using selected levels of force) against the ID crash stop (with known elasticity), multiple, centered, adjacent circular "geometric tracks" can be written with Integrated Servo (IS) sequences or other test patterns.

These circular "geometric tracks" will not follow or correspond to the pre-patterned tracks on the disk. On any given pre-patterned track, due to RRO there will be multiple adjacent IS written geometric tracks crossing through the DTM land. At any place where the read head straddles the boundary between two adjacent IS sequences, a valid PES value can be determined via known detection methods for IS signals.

By holding the actuator in a fixed position against the crash stop while reading signals from the disk, pre-patterned track crossings can be detected, and the RRO trajectory of the pre-patterned tracks can be computed from them. By changing the servo target trajectory (applying RRO compensation) to match that of the pre-patterned tracks, the servo system can follow pre-patterned tracks. After appropriate RRO compensation has been found, self-propagating servowriting can then commence for the entire data zone.

The bootstrapping of the self-servo writing process may be accomplished in alternative ways according to the invention as will be described below.

Embodiment Using Bootstrap Zone with Pre-Patterned Conventional Servo Patterns

Figure 3:
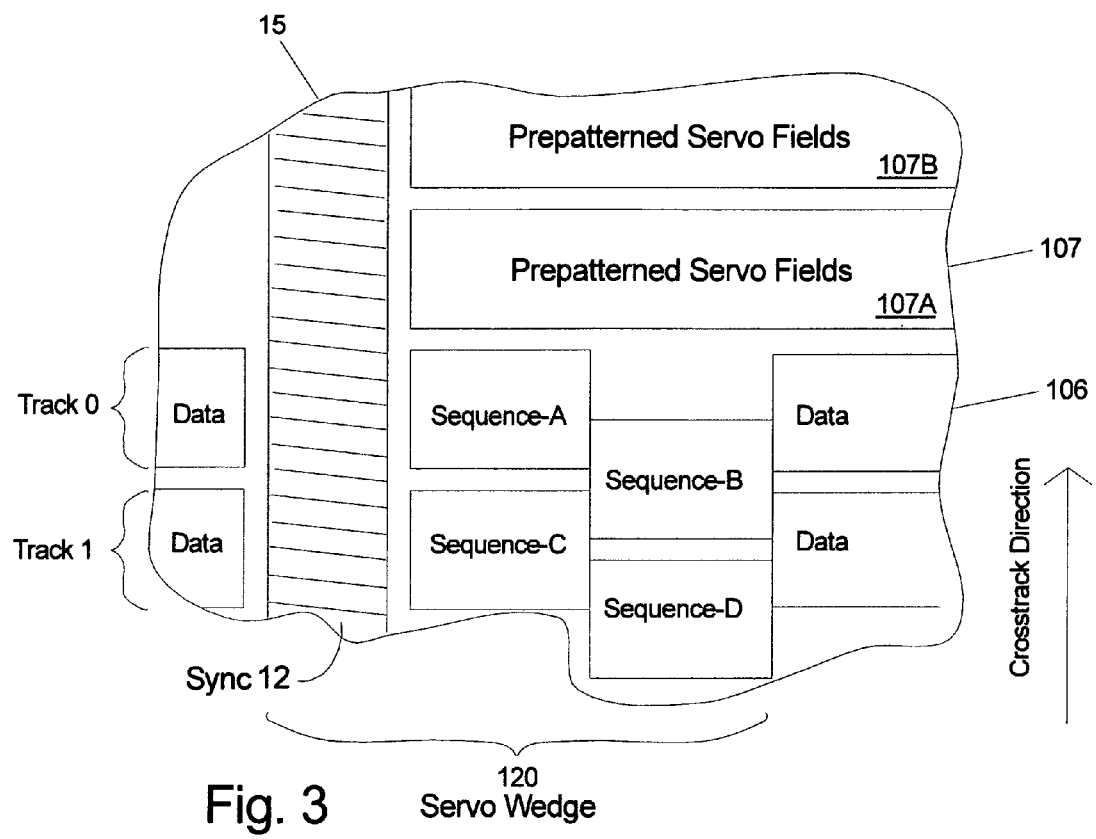
FIG. 3 is an illustration of an embodiment of a disk according to the invention showing relationships between the Integrated Servo fields in the data zone and the pre-patterned servo fields in the bootstrap zone.

One embodiment uses a bootstrap zone 107 containing prior art quad-burst servo fields that have been pre-patterned in lands of magnetic material that are formed in the thin films on the disk surface during the manufacturing process. FIG. 3 is an illustration of an embodiment according to the invention showing relationships between the Integrated Servo fields in the data zone 106 adjacent to the pre-patterned servo fields 107A, 107B in the bootstrap zone 107. Only a small selected area is shown. The figure is not to scale because as noted the pre-patterned servo fields 107A, 107B are much larger than the Integrated Servo fields. The pre-patterned servo fields 107A, 107B can include track IDs and quad-burst servo patterns designed according to the prior art. These pre-patterned servo fields 107A, 107B must be readable when DC-magnetized. In this embodiment the sync mark 12 extends into the bootstrap zone, but in alternative embodiments the sync mark 12 can be limited to the data zone.

The process of fabricating a discrete track or bit-patterned disk typically involves using a mask to etch away selected areas of magnetic material. The land and groove patterns for the bootstrap servo area can be included in the etch mask. After the land and groove patterns have been formed they can be DC-magnetized either by applying an external magnetic field to the disk as part of the manufacturing process, or the write head in the disk drive can be used to DC-magnetize the lands after the disk has been installed in the drive. The bootstrap zone can be located at the ID crash stop position. The zone should be sufficiently narrow to avoid adversely affecting head flyability, because the servo patterns will likely be poorly planarized due to variations in the size of the grooves or gaps between the lands. For example, the bootstrap zone could be about 100 μm wide. One method of bootstrapping a self-servowriting operation using a similar bootstrap zone is described in detail in related application bearing Ser. No. 12/699,501 described above in the Related Applications Section. Basically, while the actuator held against the ID crash stop, the read head, senses the eccentric and noncircular repeatable trajectories of the pre-patterned servo patterns and tracks. Using this information, the eccentricity and RRO are compensated or cancelled by a feed-forward process. An iterative process of reading and computing new compensation is performed until the servo system is capable of following the pre-patterned tracks, and then the self-propagating servo-writing can proceed track by track in the data zone until the entire data zone has been written.

For the first embodiment of the present invention, the process for self-servo writing Integrated Servo (IS) is further described below:

1. Set servo mode, if necessary, to follow the pre-patterned servo patterns in the bootstrap zone. In any embodiment in which two different types of servo fields are used on the disk the servo system is required to have the capability of track following using whatever pre-patterned servo patterns are used in the bootstrap zone as well as the IS servo patterns that will be self-written in the data zone. In this embodiment the switching between the two modes of servo operation is controlled as a part of the self-servo writing process. In alternative embodiments the servo system might automatically detect and follow either of the available servo patterns.

2. Measure the read-write offset of the heads by prior art methods. Note: the read head and the write head are separate elements in the slider and have a physical offset between the centerlines of the corresponding tracks that can be read or written when the slider is held at a fixed position. The read-write offset also changes systematically as the slider is moved between the ID and OD. The read-write offset must be measured in each disk drive for each head so that the system knows the relationship between the physical location (track) being written and the one being read at a given slider position.

3. Option A: As an alternative to Option B below (pre-magnetization), the write head can be used to DC-magnetize the pre-patterned lands of magnetic material in the bootstrap zone to complete the servo patterns. The magnetic material can be DC-magnetized track-by-track by holding the actuator against the elastic crash stop and stepping track by track by varying the force with which the actuator is pressed against the crash stop. Option B: This step should be performed prior to installing the disk(s) into the drive: apply an external magnetic field to the entire disk to DC magnetize the pre-patterned lands of magnetic material in the bootstrap zone.

4. The read head is positioned in an interior area of bootstrap zone (not at the inner or outer edge). Read the servo information for a full revolution of the disk with the actuator held as stationary as possible against the crash stop for the first iteration and after the first iteration apply previously computed servo compensation. Until the final servo compensation is found, the expected run-out will cause the pre-patterned tracks in the bootstrap zone to move inward and outward relative to the read head. The drive can read and decode the servo information for each track that passes under the read head. The information available to the system will include angular position and relative track number which will allow the system to estimate the trajectory of the stationary head (relative to pre-patterned tracks) as multiple tracks pass under the head. For each iteration of this step after the first one, the servo compensation computed will be applied to converge on acceptable track following. Test for iterative loop exit conditions for acceptable track following. For example, the target track following might be selected to be about 10% of a track pitch 3 sigma. If the loop exit conditions have been met, go to next step. If the loop exit conditions have not been met, use the trajectory information in the servo system to determine new feed-forward compensation terms for the servo compensator to compensate for the estimated RRO by adjusting the current applied to the voice coil to track follow an eccentric track in the bootstrap zone.

5. Position the write head over the first track of the data zone, i.e. just outside of the bootstrap zone. To do this the read head is first moved outward from the interior of the bootstrap zone until the read head is over the outermost track of the bootstrap zone. One method by the servo system can determine which track is the outermost one is by reading track identifier in the pre-recorded servo information. However, when the read head is over the outermost track in the bootstrap zone, the write head is not in the correct position because of the read-write offset. The appropriate adjustment in position is made using the read-write offset previously determined for the head. The result will be that the write head is now positioned over the first track of the data zone, which begins right beyond the outermost track of the bootstrap zone.

6. Write the first Integrated Servo (IS) sequence field in the pair for each servo sector in the track. Note that the servo system is still operating in the bootstrap mode because the read head, which is the source of the servo information, is still over the pre-patterned tracks in the bootstrap zone. The content of the IS sequence fields for each servo sector in a track is determined according to the teachings in related applications bearing Ser. Nos. 12/653,874; 12/653,862; 12/653,863.

For this embodiment the IS sequence relationships are as shown in FIG. 2 herein. For this part of the process, the system writes the appropriate sequence of transitions for the Sequence-A field, as shown in FIG. 2 for each sector in the track. The angular positions of sequence fields for each servo sector can be determined based on a predetermined phase relationship between the conventional servo patterns in the bootstrap zone. Thus, in one embodiment the angular position of the starting point for the first IS sequence field for each sector in the data zone is determined by the angular position of the conventional servo pattern prerecorded in the bootstrap zone. In an alternative embodiment the optional pre-patterned sync mark 12 can be used as the starting point of each sector. The length of the IS sequence fields is significantly smaller than the prior art servo fields (i.e., IS sequence fields require less track space), so the IS sequence fields for each sector in the data zone will have a smaller angular extent than the prior art servo fields in the bootstrap zone.

7. Step ½ track width out and write the second Integrated Servo (IS) sequence field in the pair for each servo sector in the track. For this part of the process, the system writes the sequence for the Sequence-B field as shown in FIG. 2 for each sector in the track. The angular position of the second sequence field is offset by the length of first sequence field as shown in FIG. 2.

8. If the read head has not reached the outermost track of the bootstrap zone, step ½ track out and loop back to step 6 to write the first Integrated Servo (IS) sequence field for the next track. If the read head has reached the outermost track of the bootstrap zone, proceed to the next step.

9. Move the read head to the first track of the data zone, and, if necessary, switch servo control mode to follow the IS patterns for the innermost track of the data zone.

10. Self-servo write the remainder of the data zone by writing the first Integrated Servo (IS) sequence field in the pair for each servo sector in the track and stepping outward ½ track to write the second IS sequence field as indicated above. Embodiments without the sync mark use timing information read by read head to synchronize writing of IS fields by the write head. In the embodiments with the pre-patterned sync mark 12, it is used to prevent temporal wandering of the IS patterns by keeping them phase-locked to the pre-patterned sync mark 12. The pre-patterned sync mark 12 can be detected in a DC magnetized state. The sync mark 12 can be magnetized, if necessary, on a track-by-track basis during the self-servo write process, or alternatively the by applying DC magnetic field to the disk as a part of the process for manufacturing the disk as in Option B above for magnetizing the lands in the bootstrap zone.

Figure 4:
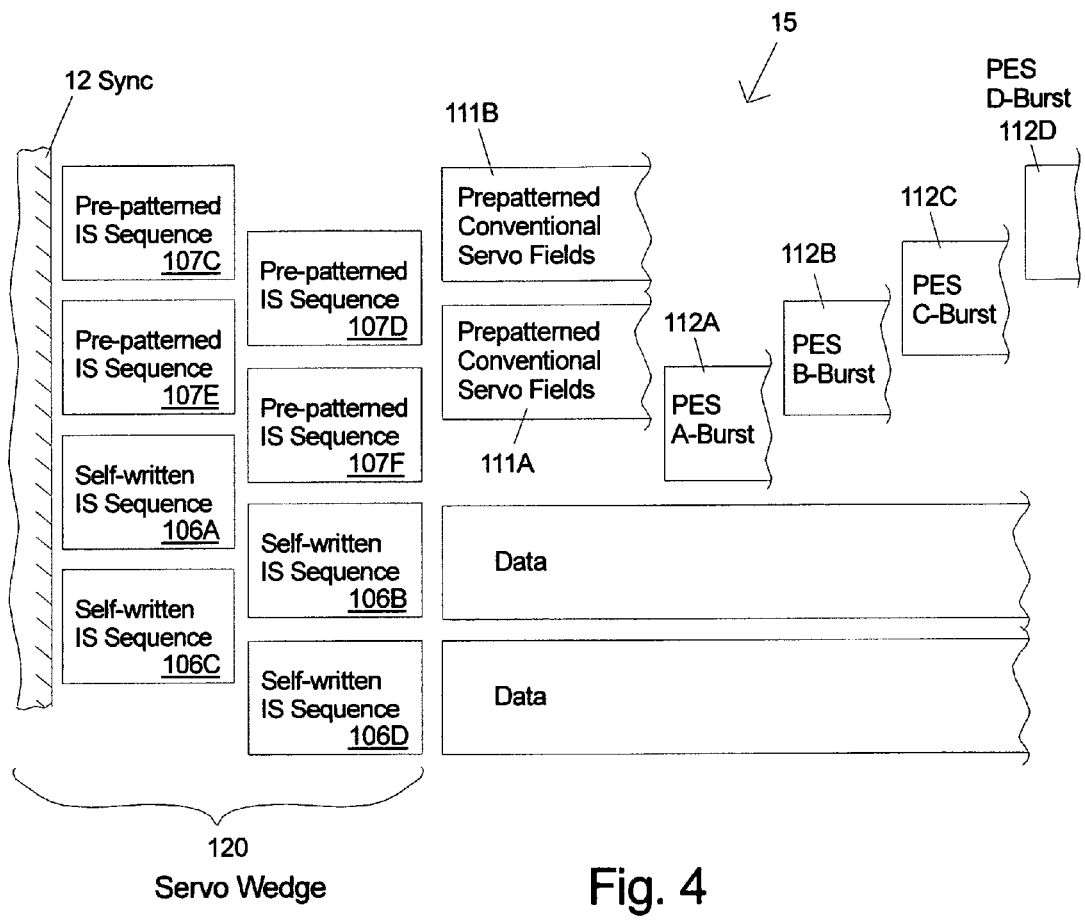
FIG. 4 is an illustration of an embodiment of a disk according to the invention showing relationships between the Integrated Servo fields in the data zone and the pre-patterned servo fields in the bootstrap zone that include both Integrated Servo fields and conventional servo fields that include track IDs.

Alternative Embodiments: To allow simpler transition of servo control from the bootstrap zone to the data zone, the disk may be pre-patterned in such a way that the bootstrap and data zones slightly overlap. One way to do this is to have the servo fields for the two zones interleaved. One method of interleaving in the overlap zone would be to have both servo patterns appear in tandem in every sector, with an angular offset between the two patterns. FIG. 4 illustrates an embodiment of this type which includes both pre-patterned Integrated Servo (IS) fields 107C-F as well as conventional servo fields 111A-B with corresponding quad-burst PES A-D fields 112A-D in the bootstrap zone. The data zone includes the self-written IS sequences 106A-D. An alternative embodiment could have sectors in the overlap zone alternately have the conventional servo fields or the IS fields. For example, odd numbered sectors could have the pre-patterned bootstrap zone pattern while even numbered sectors have the IS fields.

Any IS field written in the bootstrap zone must be readable when the entire zone is DC magnetized. The IS fields written in the data zone are preferably DC-free, which means that the +1 and −1 elements that make up the mathematical sequences are recorded on the disk with opposite magnetic polarities. Because the bootstrap zone can only use a single polarity, an adjustment must be made for the encoding of the IS sequences. The options for a bit slot in the bootstrap zone are either a) a DC-magnetized land (or closely spaced group of bit-patterned lands); or b) a groove or gap with no magnetic material. Therefore, for the IS sequences in bootstrap zone, one bit value is represented by a land of magnetic material and the other bit value is represented by a gap. The result is that the pre-patterned IS fields in the bootstrap zone are not DC free, but the same set of IS sequences can be used for the bootstrap and data zones.

Embodiment Using Bootstrap Zone with Pre-Patterned Conventional Servo Patterns without Track IDS For this embodiment the bootstrap zone contains pre-patterned features which provide fractional track information, but no track number information. For example, the bootstrap zone can contain pre-patterned null or phase patterns without any pre-patterned Gray code which encodes the track ID. The advantage in omitting the track IDs in Gray code is that it allows for better planarization. The process is as follows:

1. If necessary, set servo mode to follow the pre-patterned servo patterns in the bootstrap zone.

2. Measure the read-write offset of the head by conventional means.

3. Option A: As an alternative to Option B below (pre-magnetization), the write head can be used to DC-magnetize the pre-patterned lands of magnetic material in the bootstrap zone to complete the servo patterns. The magnetic material can be DC-magnetized track-by-track by holding the actuator against the elastic crash stop and stepping track by track by varying the force with which the actuator is pressed against the crash stop. Option B: This step should be performed prior to installing the disk(s) into the drive: apply an external magnetic field to the entire disk to DC magnetize the pre-patterned lands of magnetic material in the bootstrap zone, as well as all other magnetic material on the disk.

4. With the actuator held stationary against ID crash stop, and the read head in the middle of bootstrap zone, observe track crossings by monitoring the fractional track position signals generated by demodulating the servo bursts. Since the trajectory of the tracks relative to the stationary head are roughly sinusoidal, during the peak and trough of the trajectory, the position will be changing slowly enough to see individual track crossings and estimate the overall trajectory. Compute and apply servo compensation to try to follow the estimated trajectory. This will greatly reduce run-out, allowing a more detailed and precise estimate of track trajectory. After a few iterations of the steps of observing track crossings, computing and applying servo compensation, the servo system will be able to follow an individual track precisely (to within 10% of track pitch 3 sigma). However, due to the lack of Gray code information, the system will not know exactly which track it is following. Other than not having track IDs to rely on, the iterative process of computing and applying servo compensation is comparable to that described above.

5. Step the head toward the OD track by track until the read head leaves the bootstrap zone and enters the data zone, which detectable when the head leaves the null or phase pattern and encounters the pre-patterned tandem offset lands for the IS fields instead. The lands for the IS fields will be DC magnetized at this stage.

6. Step the head back toward the ID, using the known read-write head offset information to position the write head over the first track of the data zone. Note that the write head element is always to OD side of read head element.

7. Proceed with self-servowriting of all of the IS sequences for each sector of all data tracks as described for the first option.

Figure 5:
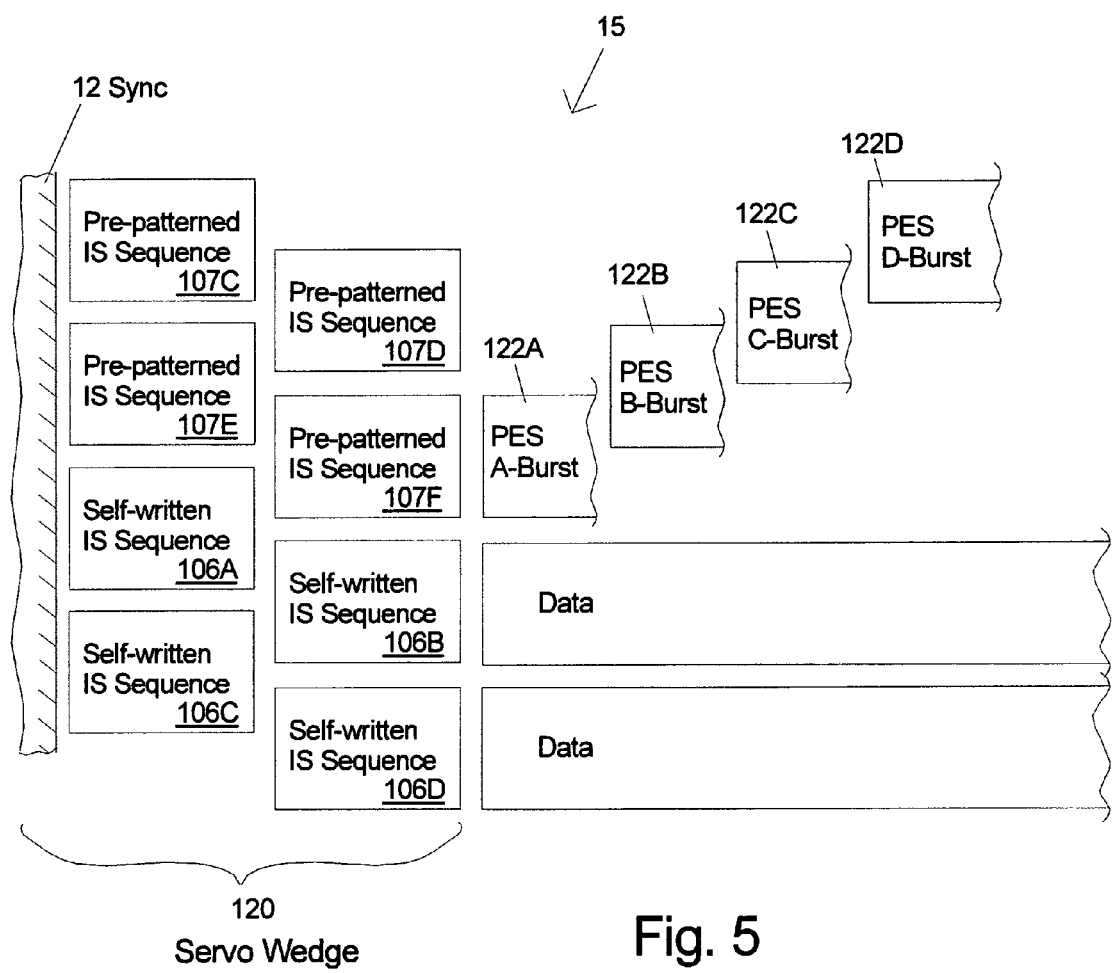
FIG. 5 is an illustration of an embodiment of a disk according to the invention showing relationships between the Integrated Servo fields in the data zone and the pre-patterned servo fields in the bootstrap zone that include both Integrated Servo fields and conventional servo fields without track IDs.

The alternative embodiments for the first embodiment described above can be applied to this embodiment as well. For example, the optional pre-patterned sync mark can be included. Additionally, the servo fields for the bootstrap and data zones can be interleaved as described above. FIG. 5 is an illustration of an embodiment of a disk according to the invention showing relationships between the Integrated Servo fields in the data zone and the pre-patterned servo fields in the bootstrap zone that include both Integrated Servo fields and conventional servo fields without track IDs. The conventional pre-patterned PES servo patterns 122A-D in this embodiment are preferably null or phase patterns.

Embodiment with No Separate Bootstrap Zone

For the third embodiment, in which there is no separate bootstrap zone, the system initiate servowriting on the tracks of the data zone using the method described below:

1. Measure the read-write offset of the head by conventional means as in the other methods.

2. Position the actuator against the crash stop. The data zone extends far enough in this case so that the head is now over the inner part of the data zone, including maximum expected run-out of tracks.

3. Write a selected number of test tracks with continuously repeating IS patterns with no intervening data fields by stepping the head outward in ½ track increments. These IS patterns will include information on the track IDs. If the optional pre-patterned sync mark is present, use it to synchronize writing of IS patterns as described above. Note that these tracks are written "blindly," i.e. without any servo feedback, by holding the actuator current constant. The path of write head will necessary deviate from the discrete tracks.

4. Move read head to approximate center of test tracks area.

5. Read the signals from the IS patterns passing under the read head with the actuator current held constant. By observing envelope of readback signal from the IS patterns, detect track crossings (each dip in envelope amplitude corresponds to one groove between discrete tracks). Estimate the pre-patterned discrete track trajectory with respect to the read head path.

6. Compute and apply compensation needed to follow pre-patterned tracks. The servo loop can be closed using track IDs wherever they can be decoded from the IS sequences. This will be the case when two neighboring tracks of information were recorded on one land, and will occur periodically around any track. Through iteration of the steps of computing and applying compensation, converge on acceptable track following.

7. When approaching acceptable track following, the half-track offsets of the tandem IS fields will be recognizable, and their timing may be known if a pre-patterned sync mark has been included. Otherwise derive timing from recognition of offset IS field #2 positions.

8. After acceptable tracking has been established on a single pre-patterned track, move the head so that the write head is positioned correctly to servowrite one track, using the known read-write offset information.

9. Stepping outward by half tracks, self-servo write the entire disk with IS fields as described above.

If a pre-patterned sync mark has been provided, this can be used to lock the position of the IS fields to the sync marks.

In each of the self-servo writing methods described herein, if a pre-patterned sync mark has not been provided on the disk, it is necessary to detect the beginning or end of the half-track shifted IS pre-patterned land. This can be done by writing information with the write head (either DC or some other pattern) that allows detection of the beginning or end of the offset IS land where it meets the groove corresponding to the previous IS field land or the groove corresponding to subsequent data track.

Alternative embodiments do not require that IS patterns are written in the bootstrap process. Any pattern which can be distinguished between neighboring ½ tracks can be used, such as different square wave frequencies on neighboring half tracks, or any other suitably orthogonal patterns. Once this is done, even though track ID information is lacking, track following on a single track (which is a necessary condition to initiate self servo writing) can be achieved by an iteration process similar to that described in embodiment 2 above.

The invention claimed is:

1. A disk for use in a disk drive comprising:
a set of tracks on a surface of the disk, the set of tracks having a generally uniform track width and being formed from thin film magnetic material separated by grooves of generally uniform width; each track in the set including a plurality of sectors; each sector including a data area and at least first and second servo field lands that include a plurality of magnetic transitions that encode first and second Integrated Servo sequences that are members of a predetermined sequence set with a plurality of members; and wherein a centerline of one of the first or second servo field lands is offset by approximately one-half of the track width from a centerline of the data area; and
a bootstrap zone that is concentric with the set of tracks, the bootstrap zone being formed from pre-patterned lands of magnetic material that form servo patterns when DC-magnetized.

2. The disk of claim 1 wherein each of the plurality of sectors includes a sync mark adjacent to the first servo field land.

3. The disk of claim 2 wherein the sync mark is separated from the adjacent data area by a groove having a width approximately equal to width of the grooves separating the tracks.

4. The disk of claim 1 wherein first and second Integrated Servo sequences are mathematically orthogonal to adjacent Integrated Servo sequences on adjacent tracks.

5. The disk of claim 1 wherein the servo patterns in the bootstrap zone include track identifiers.

6. The disk of claim 1 wherein the servo patterns in the bootstrap zone include position error signal (PES) bursts that are null patterns.

7. The disk of claim 1 wherein the servo patterns in the bootstrap zone include position error signal (PES) bursts that are phase patterns.

8. The disk of claim 1 wherein the bootstrap zone includes an interleaved servo zone that is adjacent to the set of tracks and wherein the interleaved servo zone includes first and second types of servo information and wherein the second type of servo information is encoded as Integrated Servo sequences that are readable when DC-magnetized.

9. A disk drive comprising:
a slider including a read head and a write head;
a disk having a set of tracks on a surface of the disk, the tracks being formed from generally concentric lands of thin film magnetic material separated by grooves, each track in the set including a plurality of sectors that have a data area and at least first and second servo field lands; and wherein a centerline of one of the first or second servo field lands is offset by approximately one-half of the track width from a centerline of the data area, and the disk including a bootstrap zone that is concentric with the set of tracks, the bootstrap zone being formed from pre-patterned lands of magnetic material that form servo patterns when DC-magnetized; and means for writing first and second Integrated Servo sequences on first and second servo field lands respectively using the write head, the first and second Integrated Servo sequences being members of a predetermined sequence set with a plurality of members.

10. The disk drive of claim 9 wherein the first and second Integrated Servo sequences are mathematically orthogonal to adjacent Integrated Servo sequences on adjacent tracks.

11. The disk drive of claim 9 wherein each of the plurality of sectors includes a sync mark adjacent to the first servo field land.

12. The disk drive of claim 9 wherein the first and second servo field lands and the data area for a sector are disposed consecutively along a track in a circumferential direction.

13. The disk drive of claim 9 wherein each of the plurality of sectors includes a sync mark and wherein the sync mark, and the first servo field land, the second servo field land, and the data area for each sector are disposed consecutively along a track in a circumferential direction.

14. The disk drive of claim 9 wherein the servo patterns in the bootstrap zone include track identifiers and position error signal (PES) bursts.

15. The disk drive of claim 9 wherein the servo patterns in the bootstrap zone include position error signal (PES) bursts that are null patterns.

16. The disk drive of claim 9 wherein the servo patterns in the bootstrap zone include position error signal (PES) bursts that are phase patterns.

17. The disk drive of claim 9 wherein the bootstrap zone includes an interleaved servo zone that is adjacent to the set of tracks and wherein the interleaved servo zone includes first and second types of servo information and wherein the second type of servo information is encoded as Integrated Servo sequences on DC-magnetized lands.

18. A method of operating a disk drive comprising:

positioning a read head, which is mounted on an actuator, over a bootstrap zone on a disk with pre-patterned discrete tracks by holding the actuator against a crash stop;

computing servo compensation required to follow a discrete track with the read head by observing discrete track crossings as the disk rotates under the read head generating signals in the read head;

moving the read head toward a first discrete track in a data zone on the disk and detecting a change in a signal from the read when the read head leaves the bootstrap zone and enters the data zone which has pre-patterned tandem offset lands in each servo sector;

moving the read head back toward the bootstrap zone by a number of tracks equal to a read-write head offset to position a write head over the first discrete track of the data zone; and self-servowriting Integrated Servo sequences for each sector of each discrete track in the data zone by writing a first Integrated Servo sequence on a first servo land that is aligned on a centerline of the discrete track for each servo sector in the track, then stepping one-half track width out and writing the second Integrated Servo (IS) sequence for each servo sector in the track.

* * * * *